United States Patent [19]

Storgård

[11] Patent Number: 5,499,660
[45] Date of Patent: Mar. 19, 1996

[54] RELINING PIPE HAVING PIPE ELEMENTS INTERCONNECTED BY PIPE COUPLINGS

[76] Inventor: Christer Storgård, Torpankatu 10, FIN-65230 Vaasa, Finland

[21] Appl. No.: 295,673

[22] PCT Filed: Apr. 6, 1993

[86] PCT No.: PCT/FI93/00147

§ 371 Date: Sep. 9, 1994

§ 102(e) Date: Sep. 9, 1994

[87] PCT Pub. No.: WO93/20381

PCT Pub. Date: Oct. 14, 1993

[30] Foreign Application Priority Data

Apr. 7, 1992 [FI] Finland ..................... 921535

[51] Int. Cl.⁶ ..................................... F16L 1/00
[52] U.S. Cl. ................. 138/98; 138/97; 138/109; 264/269; 405/150.1
[58] Field of Search .................. 138/109, 97, 98, 138/120, 155, 177, 178; 405/150.1, 153, 151; 285/921; 264/269

[56] References Cited

U.S. PATENT DOCUMENTS

| 3,562,056 | 9/1971 | Olson . | |
|---|---|---|---|
| 3,872,894 | 3/1975 | Streit | 138/155 |
| 4,096,887 | 6/1978 | Streit | 138/155 |
| 4,201,497 | 5/1980 | Artweger | 405/151 |
| 4,770,445 | 9/1988 | Steer et al. | 285/921 |
| 4,773,149 | 9/1988 | Kip et al. | 138/155 |
| 4,796,669 | 10/1989 | St. Onge . | |
| 4,848,407 | 7/1989 | Smith et al. | 138/97 |
| 5,078,430 | 1/1992 | St. Onge | 285/15 |

FOREIGN PATENT DOCUMENTS

| 0365900 | 5/1990 | European Pat. Off. . |
| 902118 | 5/1982 | Finland . |
| 813570 | 4/1990 | Finland . |
| 462444 | 6/1990 | Sweden . |
| WO87/06675 | 11/1987 | WIPO . |
| 89/03956 | 5/1989 | WIPO . |

Primary Examiner—James E. Bryant, III
Attorney, Agent, or Firm—Oblon, Spivak, McClelland, Maier & Neustadt

[57] ABSTRACT

A relining pipe for insertion inside sewer lines to repair them. The relining pipe is made up of a number of substantially rigid pipe elements (1), which are interconnected by pipe couplings, the pipe coupling including a female sleeve part (2) and a male locking part (3), at least one of these having a circumferential shoulder surface and the other having a stop surface pressing against the shoulder surface when the pipe elements are pressed against each other, and in the female part and the male part counterparts (5, 16) which snap-lock to each other in order to prevent the pipe elements from becoming detached from each other. The pipe element (1) has, as an extension of the male part (3) towards the female part (2), a shoulder ring (6) which is integral with the element and the outer diameter (D3) of which is approximately the same as the outer diameter (D2) of the female part. This shoulder ring has a shoulder surface (7) against which the stop surface of the outer edge of the female part (2) presses when the pipes are pressed together.

5 Claims, 1 Drawing Sheet

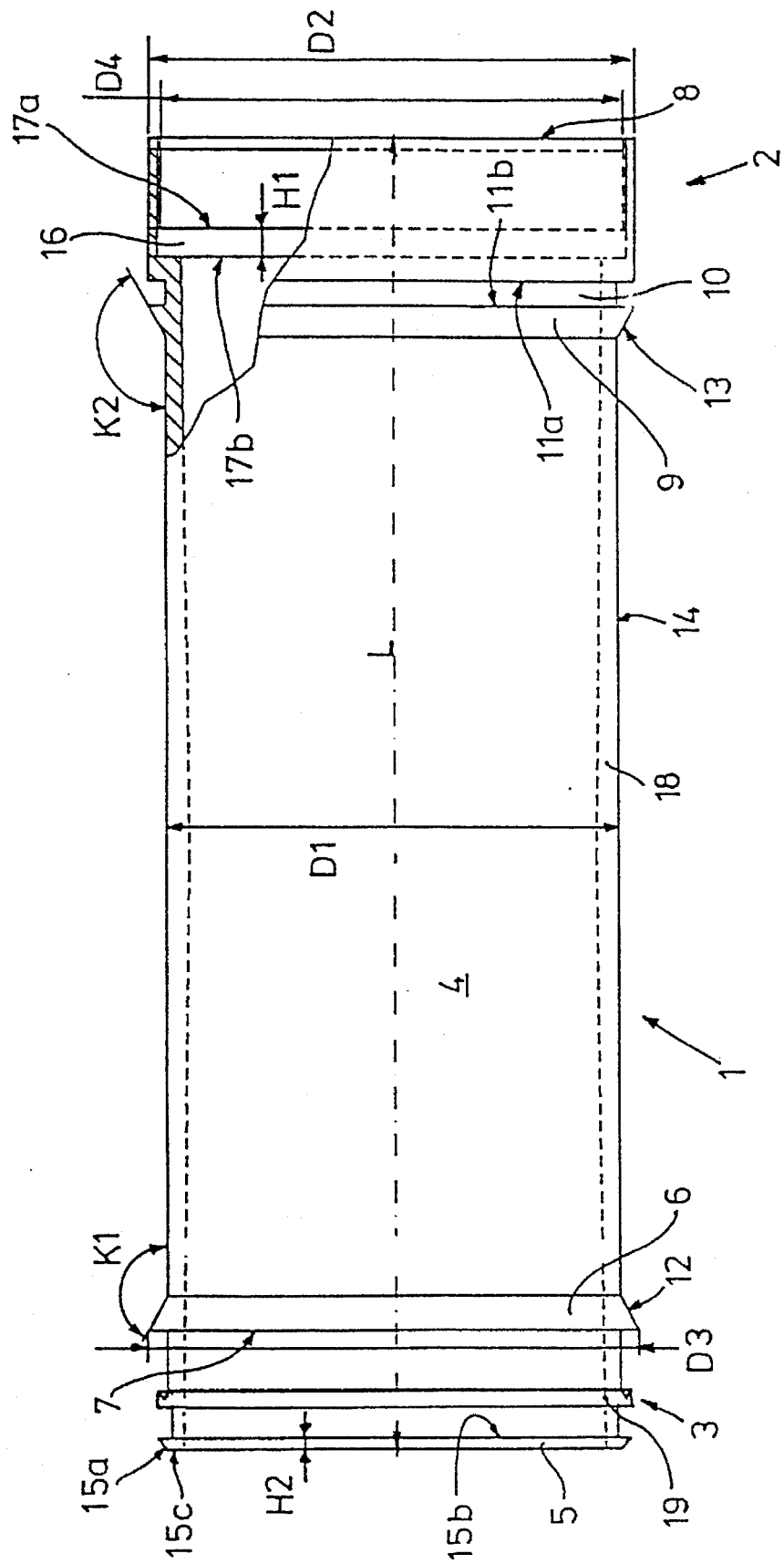

RELINING PIPE HAVING PIPE ELEMENTS INTERCONNECTED BY PIPE COUPLINGS

TECHNICAL FIELD

The invention relates to a relining pipe for insertion into a sewer line and similar pipelines to repair them, the relining pipe being made up of a number of substantially rigid pipe elements which are interconnected by pipe couplings, such coupling comprising a female sleeve part, the outer diameter of which is greater than that of the pipe part, and a male locking part, at least one of them having a circumferential shoulder surface transverse to the pipe length and the other having a transverse circumferential stop surface pressing against the shoulder when the pipe elements are pushed against each other, wherein in the bottom of the female part and at the outer end of the male part there are counterparts which snap lock to each other in order to prevent the pipe elements from being detached from each other under tension.

BACKGROUND ART

Many, for example, buried pipelines, such as sewer lines, and among these in particular concrete sewer pipes, deteriorate gradually, and for various reasons also other damage may appear in them, such as cracks, ruptures, and the like. At some stage the pipelines in use must be repaired. This can, of course, in the case of sewer lines be done by digging them up and by replacing them with new pipes. However, the excavation and filling work is expensive and time-consuming, and additionally the excavations cause disturbance to traffic, for example in cities. For this reason, damaged pipelines are now being repaired by means of so-called relining pipes which are, for example, plastic pipes which are inserted from the end of the pipeline section to be repaired into the original pipe, whereby the original pipe is lined inside.

There are several types of such relining pipes. One possibility is to use flexible, for example corrugated, plastic piping, the parts of which are interconnected by welding above ground and the pipe is inserted in a continuous form, for example, through a manhole, into the pipeline section to be repaired. Such piping is inexpensive, but it can be used only in relatively small diameters, since a large-diameter pipe cannot flex in the small space of a manhole. In addition, in such a pipe structure it is difficult to arrange a branching system which could be implemented without opening the intersection area.

Another possibility is to use pipe elements the length of which is at maximum the diameter of a manhole, in which case the pipe elements can be inserted one at a time to extend a pipe element or a row of pipe elements already in the sewer line section, and this relining pipe made up of pipe elements is inserted always one element length at a time into the sewer line section being repaired. One possibility for forming such pipe elements is to cast or otherwise form tubular pieces having female sleeves at both ends. In addition, in this embodiment male pipe lengths are used the length of which corresponds to the length of two successively placed sleeve parts. In this case, the outermost ends of the female parts will settle against each other and the pipe length inside them will keep the ends of the elements in place. This relining pipe is thicker at the female parts than elsewhere. However, this structure has the disadvantage that counter-surfaces which bear the compression force generated between the pipe elements when they are being inserted into the sewer consist only of the said female-part ends, i.e. one point. In the contact point area of the pipe length and the base of the female part there are no surfaces resisting the push, and so the pipe length may slide through the female part to the inside of the element, thereby damaging the structure. Furthermore, this construction has no tension-resistent shaping by means of which the elements becoming detached from each other would be prevented if they for some reason have to be pulled backwards even over a small distance. The result may be a pipe lining having one or more detached joints at unknown locations, in which case the relining is to be deemed a failure.

Another relining-pipe structure is made up of elements which were originally formed from extruded piping by cutting it into suitable lengths and by machining at one end of each of the elements thus obtained a female sleeve part and at the other end a male locking part. In this known structure there are, in the outer edge of the male locking part and in the bottom of the female part, snap-locking counterparts which will prevent the pipe elements from becoming detached from each other under tension. In addition, in this structure it is relatively easy to produce two sets of counter-surfaces resisting pressure, whereupon the couplings between the pipe elements will withstand pushing relatively well. However, this structure is expensive, since the pipe has to be extruded so as to have very thick walls in order to enable a sufficiently sturdy female sleeve part and a male locking part to be machined in it. In this case the material costs are very high. In addition, the manufacture of the female part and the male part entirely by machining increases the price and occasionally causes dimensional errors. These dimensional errors in the female part or the male part complicate installation, or sometimes even make it impossible. On the other hand, if the extruded pipe were made with thinner walls, the wall of the female part and the wall of the male part would be so thin that the joint would break when the pipes are pressed together. In this alternative the relining pipe in its entirety has a smooth exterior surface.

DISCLOSURE OF THE INVENTION

The object of the invention is to provide, for the forming of a relining pipe, elements with a relatively small wall thickness. In other words, the purpose is to provide pipe elements which do not have excessive material considering the requirements of the functioning of the relining pipe during use. Another object of the invention is to provide pipe elements of this type, which can be coupled successively and which thereupon have sufficient counter-surface areas to withstand the considerable compressive force the coupling is subjected to at the time the relining pipe is being inserted. This compressive force is due to the fact that the length of the pipe section to be inserted may be up to 300 meters, lengths of 50 meters being very common, and there may be curvature in these sections. Thus the coupling between the last pipe element and the previous pipe element is subjected to the resistance caused by the friction between the entire relining-pipe section and the sewer wall. It is a third object of the invention to provide a relining pipe of this type, made up of pipe elements, with the friction between its outer surface and, for example, a sewer wall being minimal in order to minimize said compressive force caused by friction. It is a further object of the invention to provide a pipe element of this type, with minimized possibility for dimensional errors and consequent installation problems.

The problems described above can be solved and the objects defined above can be achieved by means of a relining pipe according to the invention.

The most important advantage of the invention is that the material costs of the pipe are very low, and that the elements can be manufactured by a technique in which there is hardly any possibility for dimensional errors. It is a further advantage of the invention that the couplings between the elements withstand very sturdily both compressive and tensile forces, and that the friction of the outer surface of a relining pipe made up of the pipe elements in, for example, a sewer line, is low.

The invention is described below in detail, with reference to the accompanying drawing.

BRIEF DESCRIPTION OF THE DRAWINGS

The figure depicts a side view, partly cutaway, of a relining-pipe element according to the invention.

BEST MODE FOR CARRYING OUT THE INVENTION

The figure shows a relining-pipe element 1 which has a relatively thin pipe part 4 wall 18, the thickness of which has been dimensioned so as to be just sufficient to function as an installed lining and to withstand the compression caused by the insertion. At one end of this pipe element 1 there is a female sleeve part, the outer diameter D2 of which is greater than the outer diameter D1 of the pipe part 4, and at the other end a male locking part 3. In the bottom of the female part 2 and at the outer end of the male locking part 3 there are locking ring 5 and locking groove 16 which snap lock to each other, preventing the pipe elements from being detached from each other when pulled. According to the invention, the pipe element has, as an extension of the male locking part 3, a shoulder ring 6 which is integral with the element, this shoulder ring being at that edge of the locking part which faces the pipe part 4 and the female part 2. The outer diameter D3 of this shoulder ring 6 is on the same order of magnitude as the outer diameter of the female part, and this shoulder ring has, facing the locking part, a shoulder surface 7 transverse to the length L of the pipe. The outer edge of the female part 2 forms a stop surface 8 transverse to the length L of the pipe. When, at the time a coupling is being formed, the male part 3 pushes inside the female part 2, the shoulder surface 7, which is on that side of the shoulder ring 6 which faces the male part, will settle against the stop surface 8 of the female part 2. Thereby one sturdy surface pair is formed to resist compressive force.

As an extension of the female part 2 towards the male part 1 there is a limiting ring 9, which is also integral with the element. Between this limiting ring 9 and the female part there is a circumferential groove 10 which has side surfaces 11a and 11b transverse to the length L of the pipe. The groove 10 extends from the outside approximately to the level of the outer surface 14 of the pipe part 4. This groove 10 is for a locking chock, which is used when interconnecting the relining-pipe elements. When most of the latest relining-pipe element, specifically the male locking part 3 first, has been inserted into the sewer pipe to be repaired, a flat locking chuck is inserted into this groove 10, into which it fits with relative precision. Thereafter, the next relining-pipe element is placed as a continuation of this abovementioned element, and the male part of the latter element is pushed into the female part of the preceding element by means of, for example, a hydraulic cylinder. Thereupon the locking chuck will settle against the manhole wall, thus preventing the movement of the already inserted relining-pipe section in the direction of the sewer by supporting the pipe via this groove 10.

Both the shoulder ring 6 surface 12 which faces away from the male locking part 3 and the limiting ring 9 surface 13 which faces away from the female part 2 are beveled. Each of said surfaces 12 and 13 forms an angle K1 and respectively K2 relative to the outer surface 14 of the pipe part 4, the angles being at minimum of approx. 120°, and preferably at minimum of 135°. These angles K1 and K2 may be mutually equal or unequal, and an angle value in the order of approx. 150° has been observed to be especially advantageous; such angles are shown in the embodiment of the figure. In this case, the relining pipe will be in contact with the wall of the sewer being repaired over a length somewhat greater than the length of the female part, and since the outward-facing edge surfaces 12 and 13 of this section are sufficiently beveled, this protruding section, the diameter of which is D2, cannot foul on anything, and the resistance to push is very small.

In order to provide the snap locking, there is provided on the outer edge of the male part 3 a locking ring 5 equipped with an outwardly beveled surface 15a and a surface 15b which faces the pipe part 4 and is transverse to the pipe length L. This outwardly beveled surface 15a thus constitutes part of a conical surface the tip of which points in the same direction as the male part, in order that the locking ring would push with sufficiently low resistance into the female part. In the bottom of the female part 2 there is a locking groove 16 having a greater diameter than the inner diameter D4 of the rest of the female part, the groove having a stop surface 17a facing the outer edge of the female part, and the transverse surface 15b of the locking ring 5 engaging behind it in order to prevent the locking ring of a second pipe, and thereby the entire pipe, from being detached from the first female part and the corresponding pipe. The bottom of the locking groove 16, i.e. the side surface facing away from the outer edge of the female part, is preferably shaped as a shoulder 17b transverse to the length L of the pipe element. The section 15c from the beveling 15a of the outer edge of the locking ring 5 towards the center line of the pipe is also a transverse stop surface. This section 15c presses against the shoulder 17b of the female part when the male part is pressed into the female part, whereby a second surface pair withstanding the pressure between the pipe elements is formed. The length H1 of the locking groove 16 in the longitudinal direction L of the pipe is arranged to be greater than the thickness H2 of the locking ring 5 in the same direction, whereby a small angular difference between successive relining-pipe elements is made possible. This angular difference, in turn, enables a relining pipe made up of pipe elements to be inserted into a curved sewer or the like. The male part additionally has a groove for a sealing 19, which seals successive pipe elements to each other in a manner known per se.

I claim:

1. A relining pipe for insertion inside sewer lines and similar pipelines in order to repair them, which comprises:

a plurality of substantially rigid pipe elements (1)

a coupling interconnecting said pipe elements, said coupling having a female sleeve part (2) the outer diameter (D2) of which is greater than the outer diameter (D1) of a wall of the pipe elements, and a male locking part (3) wherein a bottom of the female part and the outer end of the male part have counterparts (5, 16) which snap-lock to each other in order to prevent the pipe elements from being detached from each other under tension;

the pipe elements each having (1), as an extension of the male locking part (3), an integral shoulder ring (6) wherein the outer diameter (D3) of the shoulder ring is substantially the same as the outer diameter (D2) of the female part, and which has a shoulder surface (7) transverse to a length (L) dimension of the pipe element, a stop surface (8) formed by the outer edge of the female part pressing against said shoulder surface (7) when the pipe elements are pressed together, thereby forming a first support surface pair, wherein the bottom of the female part (2) is a shoulder (17*b*) transverse to the length of each of said pipe elements, and wherein a stop surface (15*c*) formed by the outer edge of the male part (3) presses against said shoulder surface (17*b*) when the pipe elements are pressed together, thereby forming a second support surface pair.

2. A relining pipe according to claim 1, wherein each of the pipe elements (1) has, as an extension of the female part (2) towards the locking part (3), an integral limiting ring (9); wherein between said limiting ring and the female part a groove (10) is positioned, the groove having side surfaces (11*a*, 11*b*) transverse to the pipe length (L) and the groove extending approximately to the level of an outer surface (14) of the wall of each of the elements, and wherein the shoulder ring (6) is located on each of the pipe elements at a point towards the female part (2) from the male part (3).

3. A relining pipe according to claim 1 or 2, wherein the shoulder ring (6) surface (12) facing away from the male locking part (3) and the limiting ring (9) surface (13) facing away from the female part (2) are beveled in such a manner that each of the said surfaces (12, 13) forms an angle (K1 and K2) to the outer surface (14) of each of the pipe elements, the angles being at a minimum substantially 120° in order to ensure the movability of the relining pipe.

4. A relining pipe according to claims 1 or 2, wherein the outer edge of the locking part (3) has a locking ring (5) provided with an outwardly beveled surface (15*a*) and a surface (15*b*) facing the pipe part (4) and transverse to the pipe length (L), and the bottom of the female part 2 has a locking groove (16) having a greater diameter than the inner diameter (D4) of the rest of the female part, the locking groove having in its outer edge a transverse stop surface (17*a*) for providing the snap-locking, wherein the bottom of the locking groove comprises said transverse shoulder (17*b*) and the section from the beveling (15*a*) of the locking ring (5) towards the center line of the pipe comprises the stop surface (15*c*), and wherein the length (H1) of the locking groove (16) in the longitudinal direction (L) of the pipe is substantially greater than the thickness (H2) of the locking ring in the same direction.

5. A relining pipe according to claims 1 or 2, wherein the pipe elements (1) comprise extruded plastic pieces.

\* \* \* \* \*